United States Patent [19]

Stowe

[11] Patent Number: 4,997,248

[45] Date of Patent: Mar. 5, 1991

[54] WIDE BAND COUPLER

[75] Inventor: David W. Stowe, Medfield, Mass.

[73] Assignee: Aster Corporation, Milford, Mass.

[21] Appl. No.: 303,363

[22] Filed: Jan. 27, 1989

[51] Int. Cl.⁵ .............................................. G02B 6/26
[52] U.S. Cl. ................................................ 350/96.15
[58] Field of Search .................................... 350/96.15

[56] References Cited

U.S. PATENT DOCUMENTS

| 4,586,784 | 5/1986 | Tremblay et al. | 350/96.15 |
| 4,746,185 | 5/1988 | Shahidi-Hamedani | 350/96.15 |
| 4,798,438 | 1/1989 | Moore et al. | 350/96.15 |
| 4,869,570 | 9/1989 | Yokohama et al. | 350/96.15 |

FOREIGN PATENT DOCUMENTS

| 0293289 | 1/1988 | European Pat. Off. |
| 87/00934 | 2/1987 | PCT Int'l Appl. |
| 87/05118 | 8/1987 | PCT Int'l Appl. |

OTHER PUBLICATIONS

Stowe et al., "Wideband Coupler Components for the Subscriber Loop", SPIE vol. 991, Fiber Optic Datacom and Computer Networks, Conference Information, Sep. 8 and 9, (1988), Boston, Mass.
Birks et al., "Control of Power-Splitting Ratio in Asymmetric Fused-Tapered Single-Mode Fiber Couplers", Optics Letters, vol. 13, No. 8, Aug. 1988.
BTD Technologies Bulletin, "Wideband Fiber Optical Coupler", Apr. 1988, pp. 1-6, Rev A.
Fotopoulos, "Wavelength Flattened Eight X Eight Single Mode Star Coupler", Electron. Lett., Oct. 1986, vol. 22, No. 22.
Kieli et al., "Asymmetric Fiber Optic Coupler for LAN Applications", SPIE, vol. 722, 1986.
McDonna et al., "1.3 Micron Bidirectional Optical Transmission Over 31 km of Ibstalled Single Mode Fiber Using Optical Couplers", Elec. Let., vol. 20, 1984.
Moore et al., "Wavelength-Dependent Coupling in Single-Mode Fused Diconical Taper Couplers", SPIE, vol. 722, 1986.
Mortimore, "Wavelength Flattened Fused Couplers", Electron. Lett., vol. 21, 742, 15 Aug. 1985.
Mortimore, "Low-Loss Joints Between Dissimilar Fibers by Tapering Fusion Splieces", Electron. Lett., Mar. 1986, vol. 22, p. 318.
Ragdale, "Single Mode Fused Biconical Taper Fiber Couplers", OFS, 1983.
Rodriques, "Completely Fused Tapered Couplers: Comparison of Theoretical and Experimental Results", Electron. Lett., Jul. 1987.
Tewari et al., "Novel Method for Characterization of Single Mode Fibers and Prediction of Crossover Wavelength and Bandpass in Nonidentical Fiber Directional Couplers", Electron. Lett., Jul. 1987.
Whalen, "In-Line Optical Fiber Filter for Wavelength Multiplexing", Electron. Lett., Aug. 1985.
Wright, "Wavelength Dependence of Fused Couplers", Electron. Lett., vol. 22, 320, 13 Mar. 1986.

*Primary Examiner*—Frank Gonzalez
*Attorney, Agent, or Firm*—Fish & Richardson

[57] ABSTRACT

A wideband single-mode fiber optic coupler and method for the fabrication of the same is provided wherein at least two fibers are joined in a fused and tapered coupling region. The taper is asymmetrical in the longitudinal extent about the midpoint of the geometric center of the fused coupling region with the difference between the fiber diameters in that region changing at a varying rate along the length of the region.

19 Claims, 8 Drawing Sheets

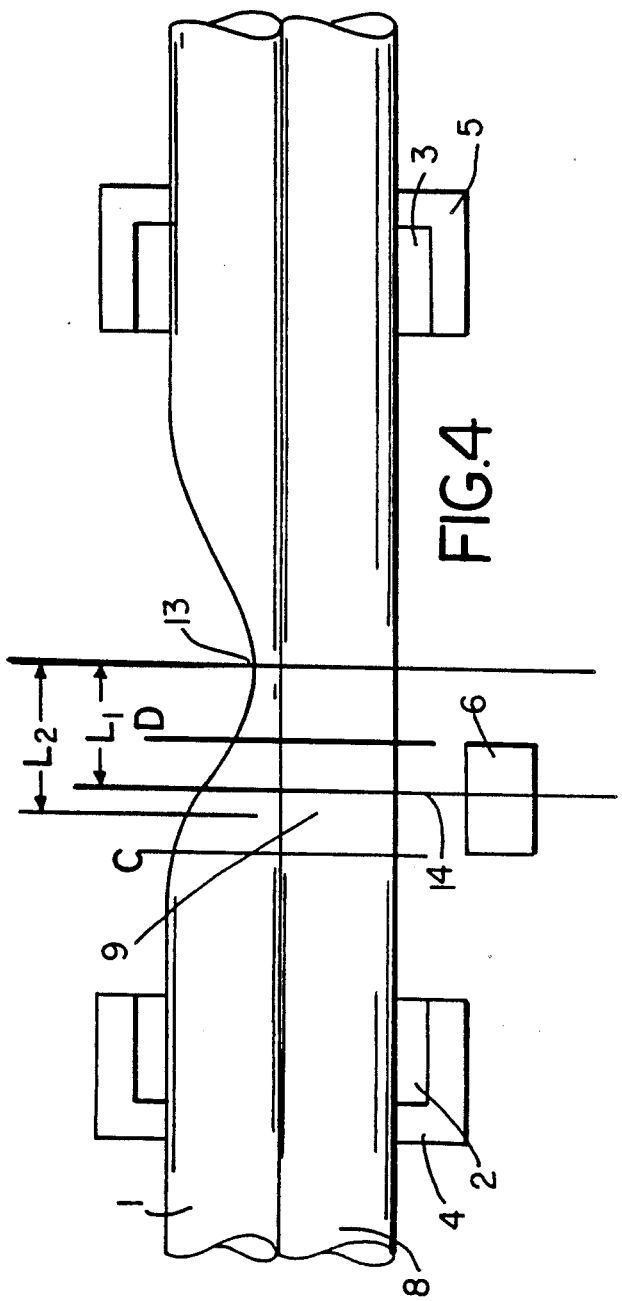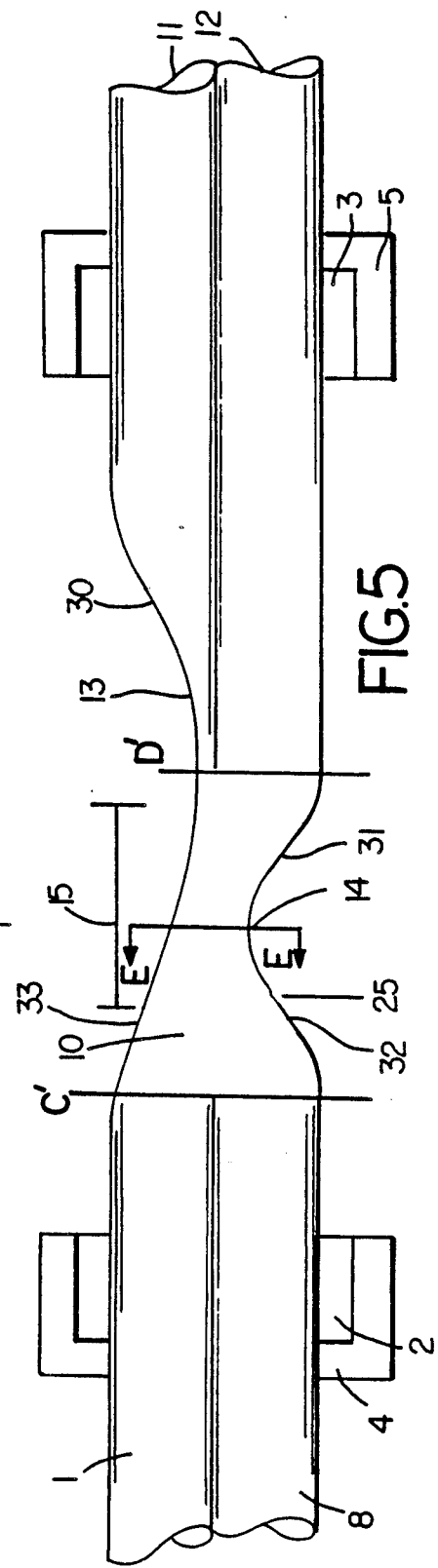

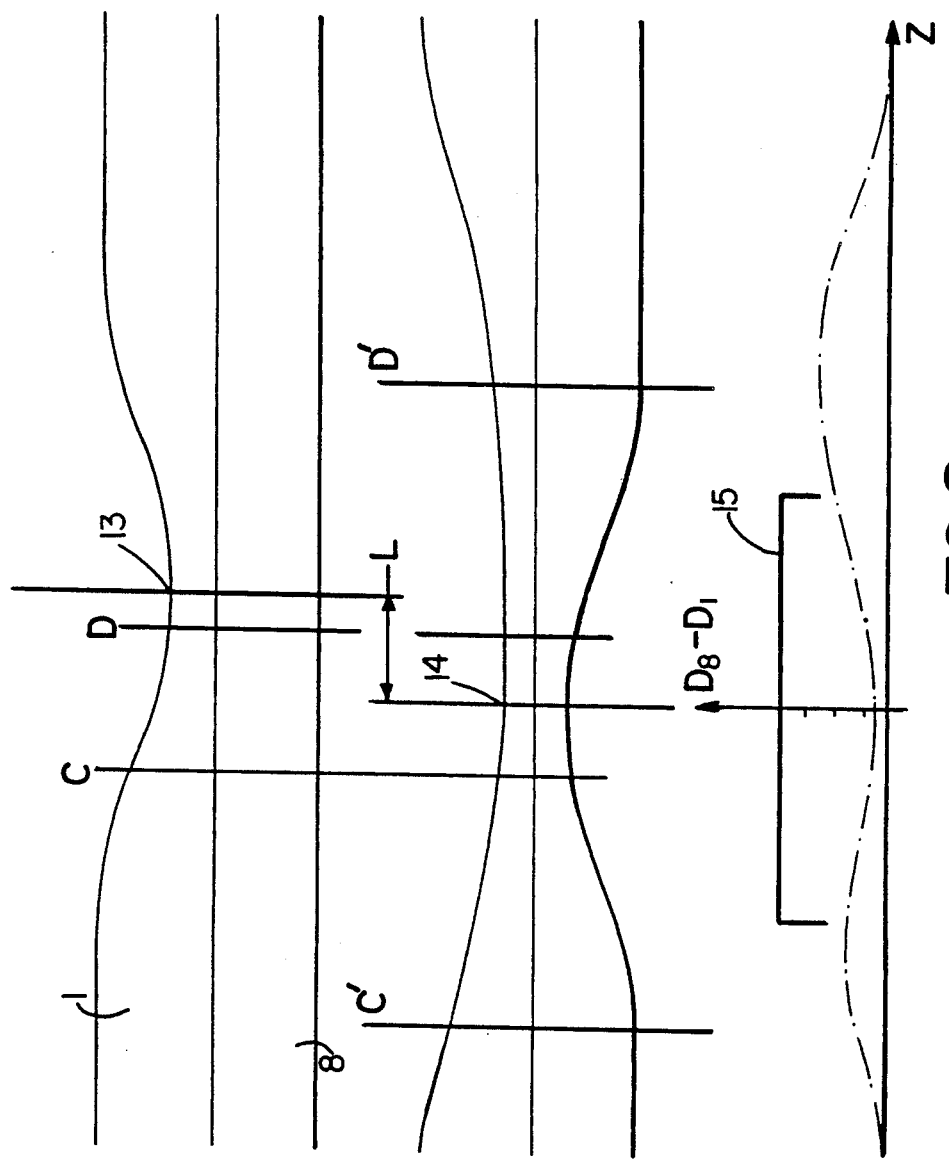

WIDE BAND COUPLER

FIELD OF THE INVENTION

The invention relates to fiber optic couplers and is of particular importance in achieving a singlemode fiber optic coupler capable of uniform optical power splitting and recombination over a broad band of optical wavelengths and a method of fabricating such a coupler.

BACKGROUND OF THE INVENTION

Fiber optic systems in existence today and those foreseen for the future require means of splitting optical power from one optical fiber into two or more optical fibers. Similarly, it can also be required to recombine optical power present in two or more optical fibers into a single optical fiber. The fused coupler has become the preferred method of achieving these aims.

A fused coupler is a device made by placing two or more fibers in mutual proximity so that the cladding glass layer of the fibers come into contact. The contacting region is usually of the order of one or two centimeters long. Heat is applied to a limited portion of the contacting region whereupon the cladding glass of the fibers fuses together. During this operation the heated fibers may be axially drawn in a manner to elongate the fused region, which simultaneously reduces the cross-sectional area of the fused region, resulting in what has become known as a fused biconical taper. In what is referred to as a conventional coupler, the fibers thus processed have identical physical parameters and dimensions. In what is referred to as a wideband coupler, the fibers to be fused may or may not have identical physical parameters and dimensions.

Of interest for many applications is the ability to manufacture a coupler in which the ratio of power output from the cross coupled fiber to the total power output from both output fibers, referred to herein as the coupling ratio, remains essentially constant as the wavelength of the input optical power is varied over relatively broad extremes. In one case it is desirable to operate within an optical bandwidth near one of the preferred optical wavelength regimes of commercially available laser diodes. In this case the wavelength dependence of conventional couplers is strong enough that wavelength variations from laser to laser can cause substantial variation in system performance. For example, a typical laser diode may be specified to operate at 1300 nm+/±40 nanometers (nm). The coupling ratio of conventional couplers usually varies about 0.1 to 0.2 percent per nanometer. Over the specified wavelength tolerance of such a laser diode the coupling ratio may vary from 42 to 58 percent or more, an undesirably large variation.

In another case such as wavelength division multiplexed systems, it may be desired to couple equally at two wavelengths which are relatively far apart, e.g., 1300 nm and 1550 nm. In this latter case, dual window couplers have been fabricated which possess equal splitting ratios at the two design wavelengths. These devices tend to have rather strong wavelength dependence, however, so that optical sources must be chosen to match the coupler windows or vice versa; otherwise the planned coupling ratios may not be realized.

In both cases the best solution is a coupler with coupling ratio essentially independent of the optical wavelength.

It has been shown in theory and in practice that the wavelength dependence of the coupling ratio in such a fiber optic structure can be reduced to some extent in several ways, but with certain drawbacks. In one case wavelength dependence has been reduced by keeping the coupling length as short as possible while also using small diameter etched fibers which are fused into a nearly circular cross-section. Couplers of this type may be generally classified as bi-axially symmetric couplers in as much as the coupling region is essentially symmetric in the longitudinal direction about the point of minimum taper diameter, and they are also symmetric in cross-section. The techniques employed to make such couplers, etching and/or careful control of the dimensions of the tapered coupling region, can result in couplers which are satisfactorily independent of wavelength, but such processes are difficult to tune and control in a manufacturing environment, leading to unwanted non-uniformity among the couplers thus produced, and low manufacturing yield.

Another prior approach is mentioned in D. B. Mortimore, "Wavelength Flattened Fused Couplers", Electronics Letters, Vol. 21, 742, 1985 and International Publication No. WO 87/00934. Wavelength independence is achieved by pretapering one of the two fibers used to make a coupler. Pretapering, i.e., heating and drawing one of the fibers to a reduced diameter prior to fusion of the two fibers, results in alteration of the propagation constant of the pretapered fiber. The pretapered fiber is subsequently fused to the other fiber. This may result in a tapered structure which is longitudinally symmetric about the point of minimum pretaper diameter, but the cross-section is regarded as asymmetric. (See also T. A. Birks and C. D. Hussey, "Control of power-splitting ratio in asymmetric fused-tapered single-mode fiber couplers", Optics Letters, Vol. 13, No. 8, August 1988).

The resulting coupler is thus made from fibers with different local propagation constants and by virtue of that difference between the fibers in the locale of the coupling region, the bandwidth of the coupler can be increased. The difference in propagation constants between the pretapered and and non-pretapered fibers in such a longitudinally symmetric coupler does not appear to vary substantially across the longitudinal extent of the coupling region. The amount of coupled power, hence the maximum coupling ratio at any wavelength, is seen to depend upon the waist diameter of the pretaper. Considerable control of the flattened bandwidth regime and the coupling ratio is possible with this method. On the other hand, these characteristics depend upon careful control of the pretaper diameter and length as well as the fusing taper shape and length and thus may be subject to non-uniform results in a manufacturing operation. In practice, to make such a coupler it appears that one must first pretaper one fiber to a definite minimum diameter, that diameter being known to yield a specific maximum coupling ratio. Couplers of different coupling ratio, therefore, are seen to require a different pretaper setting.

In another prior approach ["Wavelength independent coupler and method of fabrication thereof", European Patent Application No. 88401245.1, Kevin L. Sweeny et al, Amphenol Corporation.] fibers of different core index of refraction hence different numerical aperture and different propagation constant are fused in the conventional manner. Here the difference in propagation constant is a result of the difference in the doping level of the cores of the two optical fibers. These types of couplers are structurally bi-axially symmetric, but their optical properties are only longitudinally symmetric. This method may not require modification of the fibers prior to fusion. The disadvantage however is that the resulting device is composed of fibers with different numerical aperture creating a mismatch between at least one of the input or output fibers of the coupler and a fiber attached thereto.

SUMMARY OF THE INVENTION

The invention is a novel fused taper broadband single mode fiber optic coupler which is not longitudinally symmetric and may or may not have a symmetrical transverse cross-section. As discussed herein and to distinguish the device from prior approaches, the invention is classified as a structurally longitudinally non-symmetric tapered coupler. The coupler of the invention is of the pretapered type wherein at least one of the fibers to be coupled is heated and drawn to a different diameter prior to fusion of the two fibers to form the coupler. Subsequent to pretapering one of the fibers, the fibers are brought into contact by crossing or other means. (Crossing, for the purposes of this discussion, describes the act of crossing generally coextending fibers over each other in a manner to press the fibers together along their length, though without twisting either fiber about its own axis. Various crossings may be used to hold the fibers together.) The heat source is then moved relative to the center of the pretapered region to the left or to the right thereof creating an offset between the center of the pretaper and the subsequent center of the coupling fusion taper. The result of this offsetting step of the invention is fusion of, for example, a cylindrical fiber with a fiber which is longitudinally and locally asymmetrically tapered in the fusion region. By this technique it is found that the selection of broadband maximum coupling ratio is dependent upon the offset distance rather than the minimum waist diameter of the pretaper.

This is found advantageously to yield independence between the final coupling ratio and the minimum waist diameter of the pretaper. Effectively, selection of the offset distance allows one to select the effective diameter of the pretapered fiber at the coupler as required to yield a specified maximum coupling ratio in the coupling draw. In this manner the diameter of the pretaper at any point along the pretaper can be selected for the fusion operation, depending upon the coupling ratio desired. One can choose the pretaper fiber diameter to be any desired value in the range beyond the minimum pretaper waist diameter to the full diameter of the original untapered fiber (for an offset distance greater than the half width of the pretaper). In practice it is preferred to form the coupler at a location spaced at least one third the half length of the biconical pretaper away from the minimum waist diameter of the pretapered fiber.

Employing the techniques of the invention, it is observed that the optical bandwidth depends upon the local rate of change of the difference between propagation constants in the two fibers in the coupling region. A unique feature of the invention is to place emphasis upon this rate of change, and to ensure that it has a significant value. While it has been generally known that the difference in propagation constants between two fibers accounts for wavelength dependent behavior, prior longitudinally symmetric approaches do not result in as broad a range of difference between the two fibers as can be achieved using the present invention. Since the local propagation constant in a fiber is proportional to the diameter of the fiber, it is possible to control the flatness of the optical bandwidth by controlling the degree of the pretaper. Degree of pretaper means the change of fiber diameter per unit length of fiber on either side of the pretaper center. The greater the degree of the pretaper, the wider the optical bandwidth of the final coupler regardless of coupling ratio.

In addition to controlling the degree of pretaper by the usual means of selecting a proper combination of heated region width and pretaper draw length, another aspect of the invention uses an asymmetrical drawing method to control the rate of change of the difference in propagation constants in the offset coupling region. It is customary to perform the coupling fusion draw by pulling the coupled fibers in opposite directions, symmetrically displacing glass about the center of the heated region. This is often referred to as a two-sided draw. However, according to the invention, it is found to be advantageous to draw the fibers during formation of the coupler by pulling in only one direction while holding the other end of the fusion region fixed relative to the center of the heated zone. This one-sided draw results in a high degree of taper on the stationary side of the taper center and a relatively lower degree of taper on the side which is pulled away from the fusion center. Combining this effect with the offset of the fusion center from the pretaper center results in increasing the range of the rate of change of the difference between propagation constants in the coupling region. By this means one can further control the flatness of the optical bandwidth without resorting to the use of different pretaper geometries and simultaneously but independently select the offset distance to yield a specified final maximum coupling ratio.

These advantages and the methods to achieve them will become more apparent in the following discussion of preferred embodiments and the drawings. First we briefly describe the drawings.

BRIEF DESCRIPTION OF THE DRAWINGS

FIG. 4 is a top view as in FIG. 3 showing a pretapered fiber and a non-pretapered fiber in contact prior to fusion.

FIG. 5 is a top view as in FIG. 4 showing an exaggerated fusion taper formed between pretapered and non-pretapered fibers.

FIG. 8 is a top view of a pretapered fiber and another fiber (a) prior to offset fusion, (b) after a two-sided offset fusion draw, and (c) the longitudinally dependent difference in diameters which results.

the longitudinally dependent difference in diameters that results.

Figure 9:
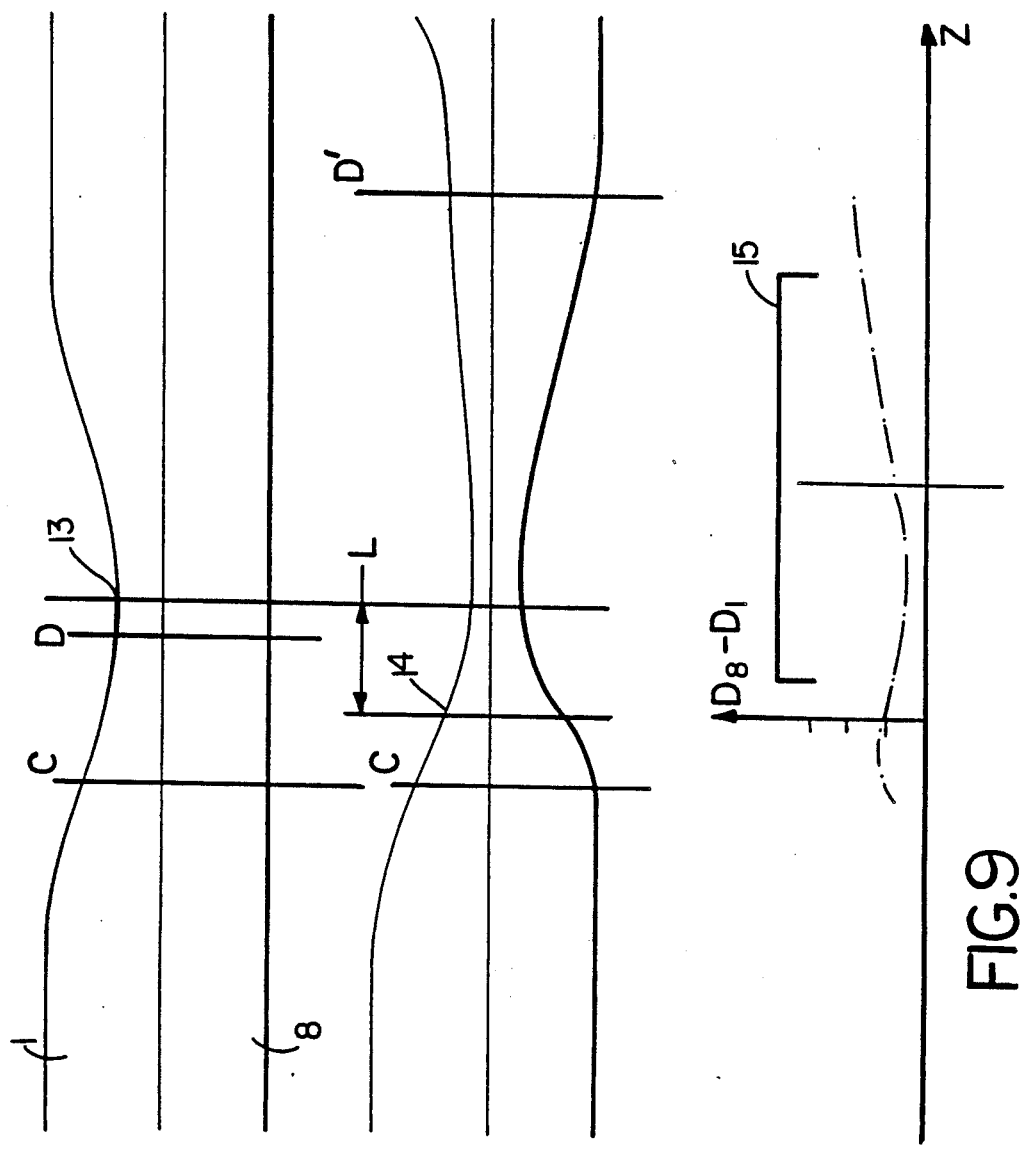
FIG. 9 is a top view as in FIG. 13 (*a*) prior to offset fusion, (b) after a one-sided offset fusion draw, and (c)
Figure 10:
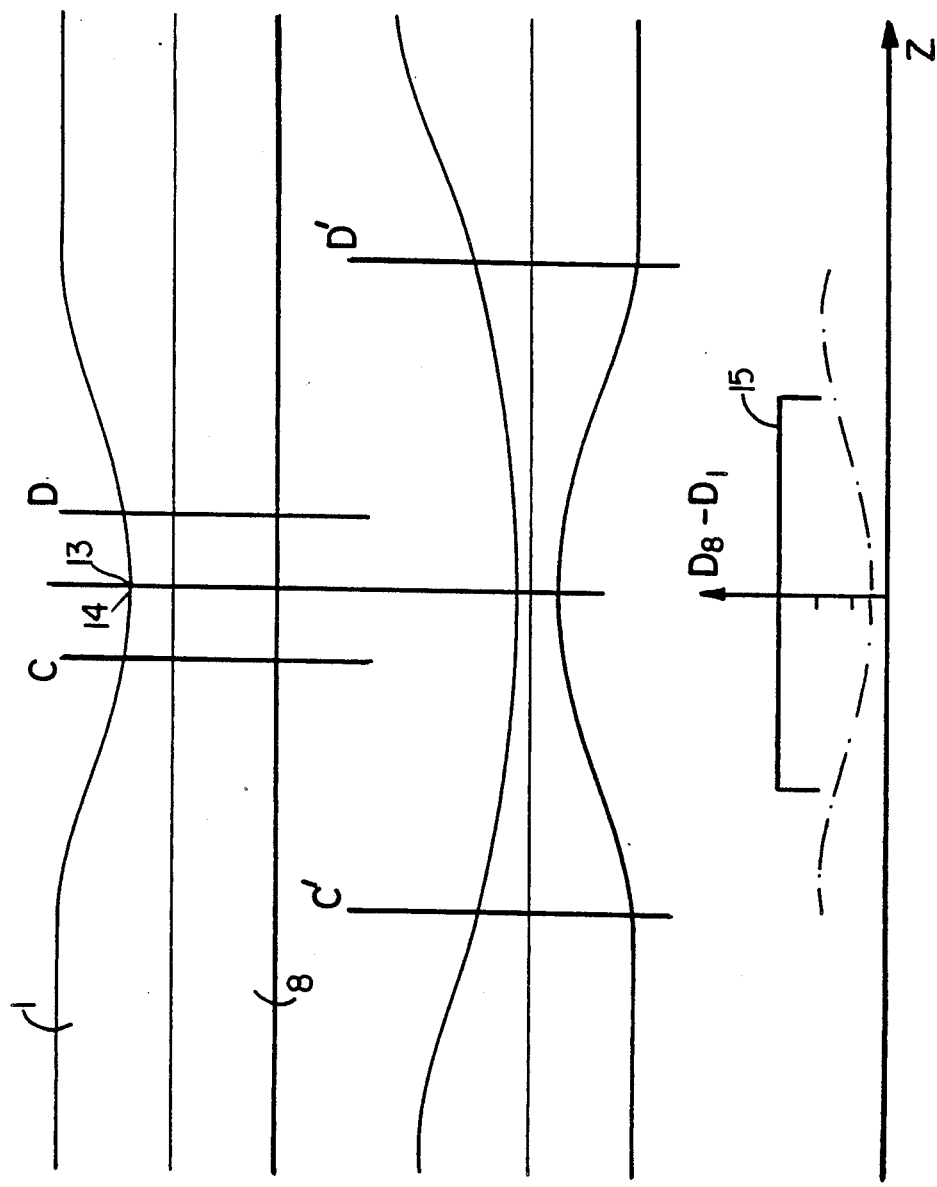

FIG. 10 is a top view as in FIGS. 8 and 9 (a) prior to non-offset fusion, (b) after a non-offset fusion draw, and (c) the longitudinally dependent difference in diameters that results.

Figure 11:
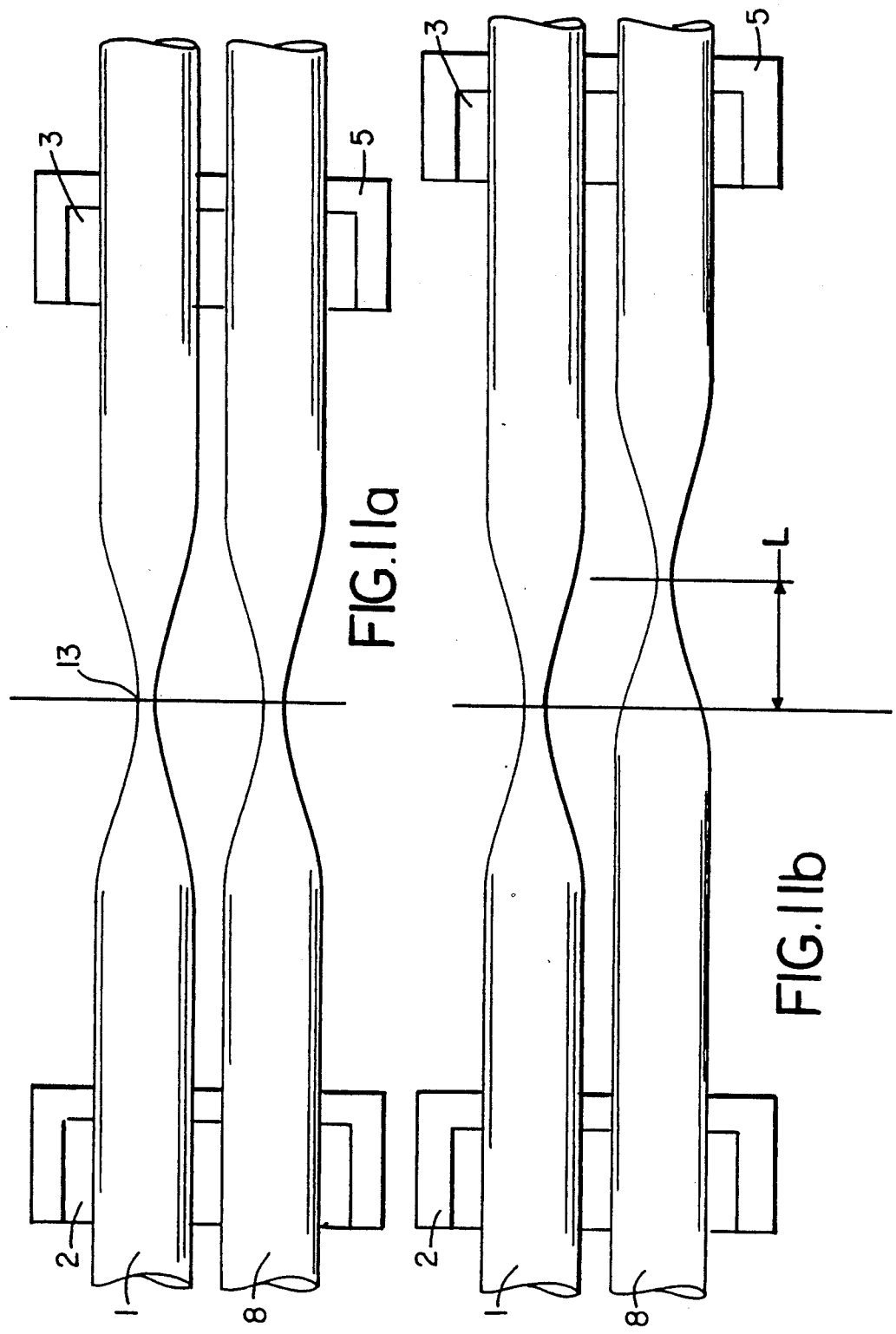

FIG. 11 comprises top views (a) and (b) of two equally pretapered fibers before (a) and after (b) longitudinal offset of the taper center of one relative to the taper center of the other.

Figure 12:
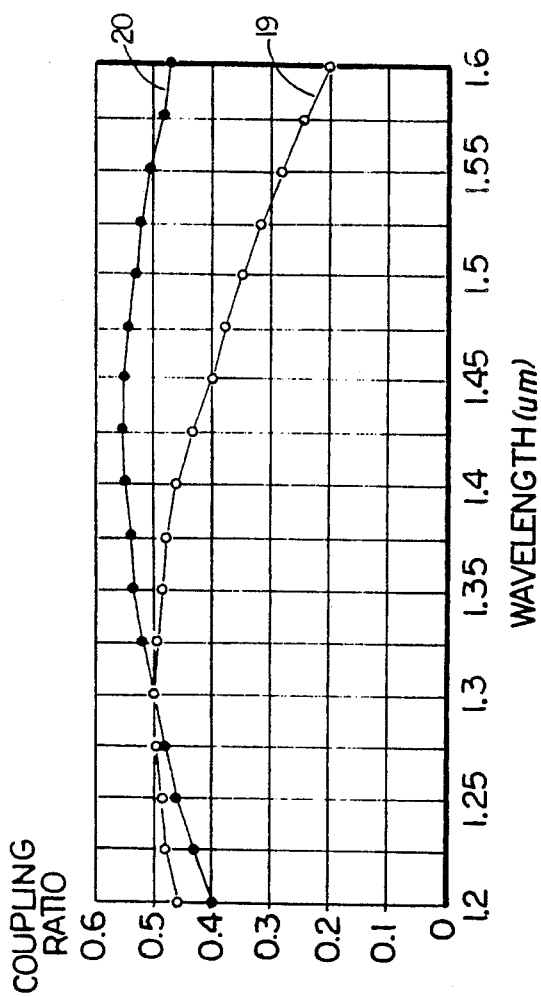

FIG. 12 is a graph of coupling ratio illustrating the advantages of the offset technique of the present invention.

Figure 13:
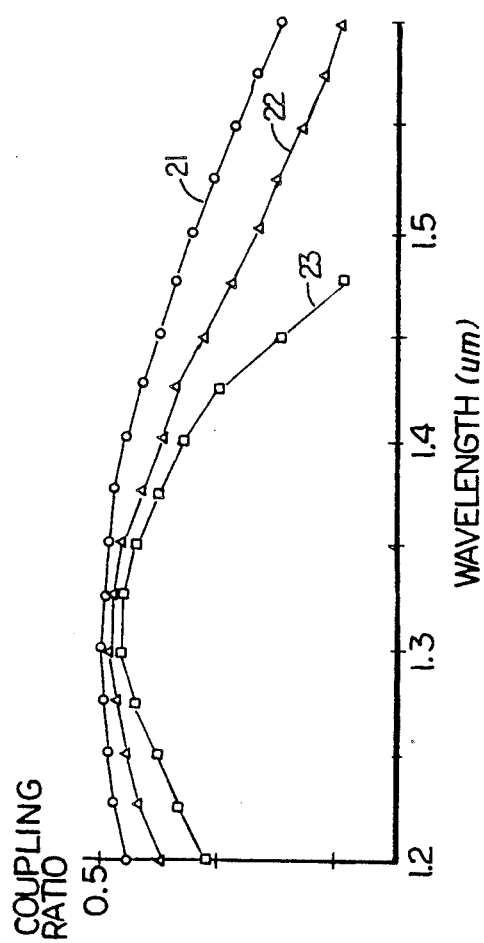

FIG. 13 is a qualitative comparison of offset drawing of the invention compared to non-offset drawing of prior art.

DESCRIPTION OF THE PREFERRED EMBODIMENTS

Figure 1:
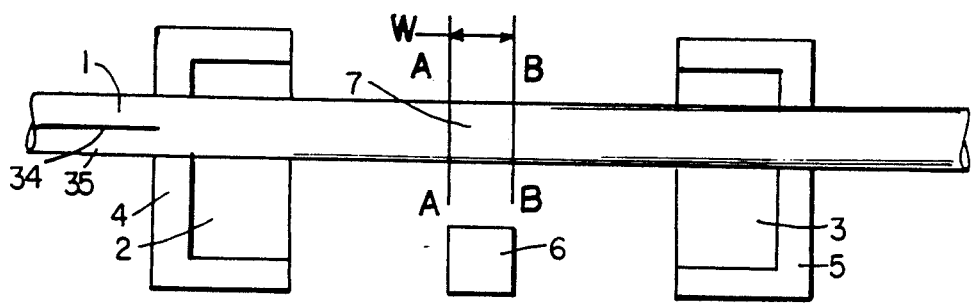
FIG. 1 is a top view of an unprocessed fiber mounted in fixtures for pretapering.
Figure 2:
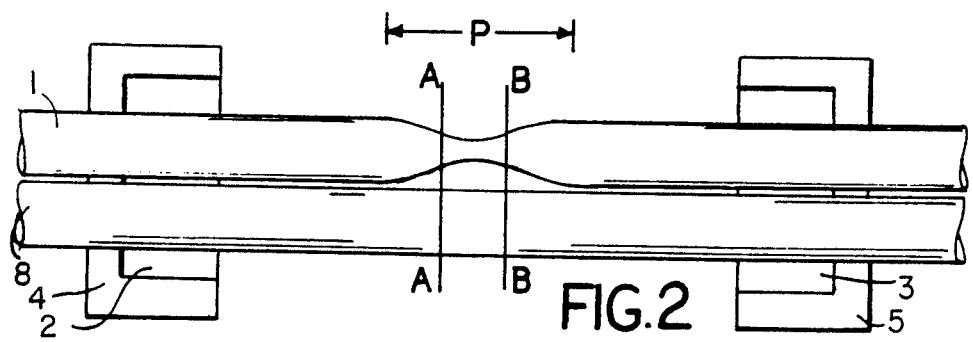
FIG. 2 is a top view of a pretapered fiber mounted beside a non-pretapered fiber.
Figure 3:
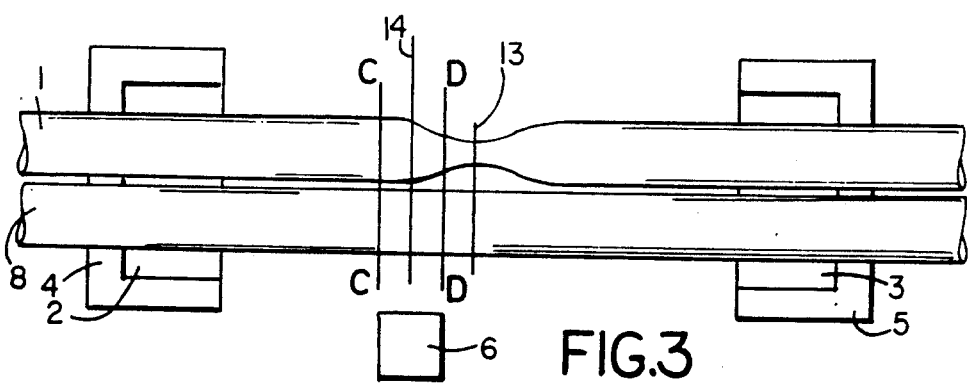
FIG. 3 is a top view as in FIG. 2 showing the heat source offset to the left of the pretaper center in a position where fusion of the two fibers may be performed.

In the preferred embodiment of the invention as shown in FIGS. 1 through 5, a fiber 1 composed of a cladding region 35 of optical material such as glass or plastic with diameter typically in the range of 70 microns to 130 microns, more or less, and a core of optical material of diameter typically between 2 and 10 microns, more or less, is placed into a fixture schematically represented in FIG. 1 to comprise a left-side clamp 2 and a right-side clamp 3 where these left and right side clamps are mounted respectively upon a left-side lateral translation stage 4 and a right-side lateral translation stage 5. A means of supplying heat 6 sufficient for the process (e.g., a torch, a resistance heated wire, or a laser) is located appropriately. Upon heating a heated region of width W, the translation stages 4 and 5 are activated to elongate the heated region 7 between locations A and B. Typically the width W of the heated region is between 2 and 4 millimeters (mm). This pretapering draw is employed to elongate fiber 1 in the heated region 7 between about 1 mm to 4 mm providing a pretaper length of P between about 3 mm and 8 mm depending upon the pretaper angle desired as well as manufacturing considerations. The preferred pretaper length usually lies in the range of 5 mm to 6 mm and usually results in reducing the diameter of the pretapered fiber between 2 percent and 20 percent, the exact reduction depending upon the characteristics desired. Lines A and B represent the boundaries of the heated region beyond which the heat source is unable to sustain temperature sufficient for drawing the fiber. The heat source is then removed and a second optical fiber 8 is placed in the clamp 2 and 3 as shown in FIG. 2. The heat source 6 is then moved laterally to a new, offset position as shown in FIG. 3, but heat is not applied at this time. By crossing the fibers, not shown in FIG. 4 for reasons of clarity, or by another means, the pretapered fiber 1 and the untapered fiber 8 are brought into contact. (An alternative to crossing the fibers as a means of holding the fibers together is to hold the fibers in a common plane and urge them together by mechanical means.) Upon heating now, the heated region 9 comprises the extent of optical fiber between locations C and D. The distance between the pretaper center 13 and the center of the heated region 14 is called the offset distance and is illustrated as L1, or alternatively L2, in FIG. 4. The translation stages 4 and 5 are again activated drawing the combined fibers, resulting in a fused pair of fibers of composite shape schematically illustrated in FIG. 5. In viewing the figures it must be kept in mind that typical fibers are about 125 micrometers (microns) or less in diameter while the distances between locations A and B or C and D are of the order of several millimeters. The taper shapes thus shown are greatly exaggerated by the horizontal scale compression necessary to illustrate the invention.

The dimensions L1 and L2 shown in FIG. 4 indicate two possible offset distances. The heat source 6 may be offset a selected amount, the amount of offset being used to predetermine the maximum coupling ratio of the coupler. As a result of choosing different offset distances, the rate of change of the difference in propagation constant between the two fibers can be adjusted. This suggests that different offset distances result in different optical bandwidths as well as different maximum coupling ratios. The degree to which this is true is generally small.

Figures 6A, 6B, 6C, 6D:
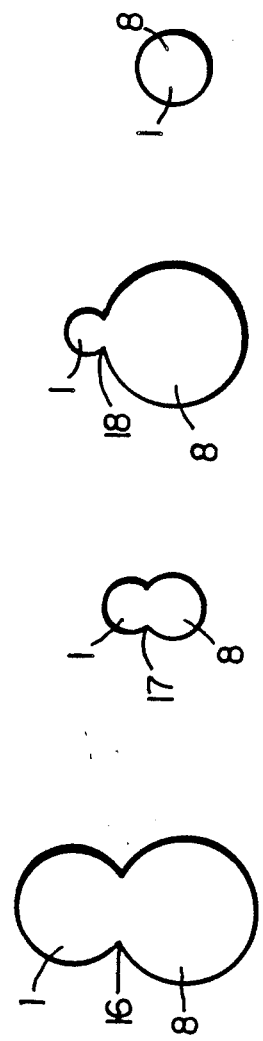
FIG. 6 is a set of cross-sectional views a, b, c, and d of four cross-sections taken at various points along the fused region illustrated in FIG. 5.

As the result of two-sided drawing, point C and D on the fiber are translated from the positions shown in FIG. 4 to the new positions shown in FIG. 5 as C' and D'. Since points C and D represent the boundaries of the fiber region 9 which was heated to the fusion temperature as illustrated in FIG. 4, in FIG. 5 points C' and D' represent the boundaries of the fused region of the fusion taper. The region between points C' and D' is referred to as the fused region and denoted 10 in FIG. 5. The bracket denoted 15 in FIG. 5 indicates the extent of the coupling region, which is offset from the point 13 of minimum diameter of the original pretapered fiber. Note that the coupling region 15 is somewhat shorter than the fused region and is considered to be geometrically centered about the center 14 of the heated region shown in FIG. 4 before drawing and in FIG. 5 after drawing. It must be pointed out that in a longitudinally asymmetric coupler the so-called center of coupling of the optical energy is not readily defined and may or may not coincide longitudinally with the geometric center of the fused region or with the point of minimum fusion taper diameter. Wherever the coupling region center may actually lie, it is believed that the rate of change of the difference in propagation constants between the two fibers is asymmetrically distributed about that center in a coupler of the invention. Approximate sectional views of the fused region are given in FIGS. 6a, 6b, 6c, and 6d. In FIG. 6a the pretapered fiber 1 is shown barely fused 16 to the non-pretapered fiber 8 as a section taken at location C' might appear in a typical coupler of this invention. In FIG. 6b is shown the section EE taken at the center of the coupling region, which is also considered to be the center of heat application for the purposes of this description. In FIG. 6b fiber 1 and fiber 8 are fused to a much greater degree as is typical of the center of the coupling region. Note, however, that the diameters of the fibers 1 and 8 are different. This is characteristic of the cross-sectional asymmetry of a partially fused coupler. (If the coupler were totally fused, a condition which can be achieved by increasing the temperature of the heat source, the cross-section at EE would appear as shown in FIG. 6d. In such a case cross-sectional symmetry in the center of the fused region is achieved.) In FIG. 6c a section as it might appear taken at location D' is shown. Here, as a result of the offset L1 between pretaper center 13 and fusion center 14 the fibers are of significantly different diameters and are barely fused since location D' previously lay at the boundary of the fusion region. These cross-sectional views therefore illustrate the cross-sectional asymmetry of the structure and further illustrate that the cross-sectional asymmetry is different on either side of the fusion center 14 thus rendering the taper longitudinally asymmetric as well.

During the process of fusing the two fibers together, optical power is applied to one of the fibers. The optical power source, not shown here, may comprise a single wavelength source as a laser diode, a broader banded optical source such as a light emitting diode, an even broader banded source such as obtainable by appropriately filtering white light, or a source comprised of two or more discrete wavelengths as available from the combined outputs of two or more laser diodes or lasers of other types. The outputs from each of the two fibers leaving the fused region 10 as indicated by 11 and 12 in FIG. 5 may be monitored by any conventional means (not shown) during the fusion step and used to determine where to cease the fusion draw. Alternatively, since the technique of the invention provides for predetermination of the maximum coupling ratio by selection of the heat source offset position, one may monitor a single output at a known wavelength and extrapolate the point at which to stop the draw to yield a desired coupling ratio at the monitored wavelength or at any other wavelength. Such capabilities lend well to computer automation of the drawing process.

Figure 7:
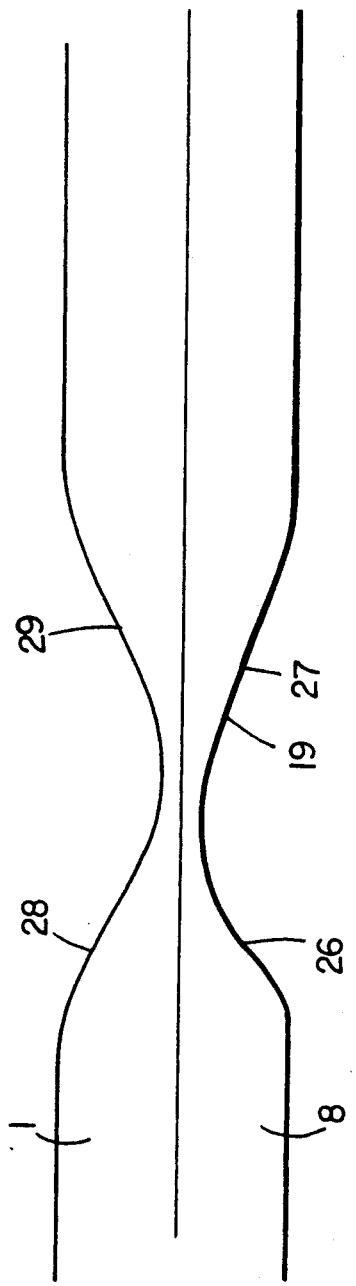
FIG. 7 is a top view as in FIG. 5 showing the more asymmetrical result of a one-sided draw.

In another similar embodiment of the invention the process proceeds as described in reference to FIGS. 1 through 4. Instead of activating both lateral translation stages 4 and 5 during the entire fusion draw, only one or the other is activated for all or part of the draw. In the event the heat source 6 is offset to the left of the pretaper center 13, as shown in FIG. 3, and the right translation stage 5 is activated to draw the fibers to the right from the center of the heated region 14, a more asymmetrical coupling region is formed as illustrated in FIG. 7. Of importance in FIG. 7 is the longitudinally asymmetric taper 19 of the non-pretapered fiber 8. Comparing the longitudinally asymmetric taper 19 of the non-tapered fiber 8 in FIG. 7 to the longitudinally symmetric taper 25 of the non-tapered fiber 8 in FIG. 5 illustrates this feature.

To better understand the differences between a two-sided draw and a one-sided draw, FIGS. 5 and 7 show the slopes of the tapers on either side of the fusion center 14. Degree of taper, as previously defined herein, and taper slope are synonymous. The tapers are seen to be smooth continuous curves with a maximum slope occurring at some point along their longitudinal extent. For our purposes here we indicate the maximum slopes of each taper. A one-sided draw results in greater values of slopes 26 and 28 of FIG. 7 than the corresponding slopes 32 and 33 of the two-sided draw shown in FIG. 5. Similarly the one-sided draw results in smaller slopes 27 and 29 in FIG. 7 than the comparable slopes 31 and 30 of the two-sided draw shown in FIG. 5.

For a further discussion of comparison between the offset draw using the two-sided and one-sided technique and the conventional symmetrical two-sided draw with no offset refer to FIGS. 8, 9, and 10. The uppermost view in FIGS. 8, 9 and 10 shows a pretapered fiber in contact with another fiber prior to drawing. The center view in FIG. 8 shows the result of a two-sided offset draw wherein the heat source was offset L to the left of the pretaper center 13. The center view in FIG. 9 shows the result of a one-sided draw wherein the heat source was offset to the left the same distance L as in FIG. 8. The center view of FIG. 10 shows the result of a two-sided draw of prior art wherein the heat source was not offset. The lowest view in each of FIGS. 8, 9, and 10 is a plot of the difference in the diameters of the two fibers. The vertical axes are labeled D8–D1 to indicate this difference. The horizontal axes indicate the location z along the longitudinal axis of the couplers represented here. In each case the bracket 15 indicates the approximate location of the coupling region.

In terms of arbitrary units on the vertical axes, the difference in diameter in the case of a two-sided offset draw shown in FIG. 8 is asymmetrically distributed and can be seen to vary between 0.3 and 1.3 in the coupling region 15. The range of diameter difference is therefore 1.0 in this case. In the case of a one-sided offset draw illustrated in FIG. 9, the diameter difference is even more asymmetrically distributed and has a range of approximately 1.4. In the case of a conventional symmetrical draw with no offset, shown in FIG. 10, the diameter difference in the coupling region is seen to be symmetrically distributed and has a range of about 0.9. This comparison illustrates the general trend of the offset drawing procedures and shows that a greater variation of diameter differences is achieved by using the offset drawing techniques than by the conventional method employing no offset.

The implication of this aspect of the invention is that the range of differences in the propagation constants between the two fibers is greater in the case of offset drawing than in non-offset drawing. To see this consider that the propagation constant of fiber 1, $B1(z)$ and the propagation constant of fiber 8, $B8(z)$ can be expressed as functions of the respective diameters as $$B1(z) = F(D1)$$

$$B8(z) = F(D8)$$

and we have shown in FIGS. 8, 9, 10 that the diameters are functions of the distance z along the fiber, so;

$$D1 = g1(z)$$

$$D8 = g8(z)$$

where g1 and g8 express the z dependence of the fiber diameters in the coupling region.

The difference in propagation constant can therefore be expressed $$B8(z) - B1(z) = F[g8(z)] - F[g1(z)]$$

The z dependent change in the difference in propagation constants is written $$d/dz[B8(z) - B1(z)] = F'[g8]dg8/dz - F'[g1]dg1/dz.$$

The same functional form F holds for both fibers, thus the rate of change of the difference in propagation constants is seen to depend upon the rate of change of diameters with respect to z as expressed by dg8/dz and dg1/dz. Since the approach of the invention gives a substantial change of diameter with z in the coupling region, as illustrated in FIGS. 8, 9, and 10, the longitudinal variation of the propagation constant difference, as expressed by the equation last written above, is seen to be greater with the offset methods of drawing of the invention than with non-offset methods of prior art. This appears to account for the observed increased bandwidth of couplers of the invention.

In yet another embodiment of the invention both fibers are pretapered the same amount. One fiber is then slid longitudinally in its clamps until the center of the pretaper in that fiber is offset from the center of the pretaper in the other fiber. This geometry is illustrated in FIGS. 11a and 11b. First both fibers are mounted in the clamps 2 and 3 and may be pretapered simultaneously in the same manner of pretapering a single fiber already discussed. Then, with the heat removed, one fiber is moved sideways relative to the other. This is particularly easy to do by simply releasing, for example, the right clamp 3 of fiber 1 and the left clamp 2 of fiber 8, then activating the right translation stage 5. This will allow the right stage 5 to pull fiber 8 while fiber 1 slips in its right side clamp 3. Fiber 8 simultaneously will slip to the right in its left side clamp 2 until the stage motion is stopped. Since motorized stages can repeat positions with accuracies of 1.0 micron or less, this method allows accurate and easy offsetting without involving adjustment in the position of the heat source. The result of moving fiber 8 to the right an offset distance L, as described here, is shown in FIG. 11b. Subsequent process steps and advantages are like those already discussed.

In another embodiment of the invention it is found advantageous to reduce the diameter of a least one of the fibers by etching prior to the process steps already discussed. Optical fibers made by some processes, for example, have an outer layer of glass which is optically unlike the the cladding glass. In this case the outer layer must be removed to avoid unwanted losses in the final coupler. On the other hand, by starting with smaller fibers, shorter tapers are possible. Thus etching prior to the other process steps already described can result in an over-all shorter coupler. This is advantageous for packaging reasons in some cases.

A feature of the invention is that the coupling region is longitudinally asymmetrical about the fusion center as well as asymmetric in cross-section, unlike prior approaches and previously studied geometries which relate only to cross-sectionally asymmetric coupling regions.

It is a feature of the invention that the process for manufacturing broadband couplers thus described can be independently calibrated so that the offset distance, defined as the distance between the pretaper center 13 and the fusion draw center 14, determines the final maximum coupling ratio of the coupler. An advantage of this is illustrated by the experimental data shown in FIG. 12. The two curves denoted 19 and 20 result from two different values of offset. Curve 19 shows a coupler drawn to be used with lasers in the 1300±/40 nm region. Over that wavelength bandwidth the coupling ratio varies no more than 0.1 dB (0.2 percent).

The curve labelled 20 in FIG. 12 results from using a pretaper of the same length and waist diameter as curve 19, but in the case of curve 20 the offset is somewhat greater. Increasing the offset increases the minimum pretaper diameter in the coupler region draw which in turn increases the maximum coupling ratio obtainable from the structure. By selecting a maximum coupling ratio in excess of 50% it is possible to draw a wideband coupler with equal coupling ratios of 50% at both 1300 nm and 1550 nm as shown. Further, the coupling ratio in the vicinity of both 1300±/40 nm and 1550±/40 nm varies no more than 2 percent which is excellent behavior for a dual window coupler. Couplers of the invention also demonstrate no coupling ratio variation with variations in the polarization state of the input optical power.

It is a further feature of the invention that the degree of taper of the pretapered fiber 1 compared to the degree of taper of the non-pretapered fiber 8 can be made to vary over greater extremes than prior approaches throughout the coupling region thereby yielding less dependence of the final coupling ratio upon the wavelength of optical power coupled. It is an advantage of this feature that by controlling the offset distance and the drawing method, i.e., two-sided, one sided, or a combination of the two, a single pretaper shape can be made to meet a very wide range of coupling ratio and bandwidth requirements thus significantly simplifying the controls required during manufacturing. It is a resultant advantage of the invention that control of coupler to coupler product uniformity is simplified.

The comparative performance for three different cases of coupler drawing technique is shown in FIG. 13. Curve 21 results from choosing an offset appropriate to yield a maximum coupling ratio of 50%. The broadbanded nature of curve 21 results further from performing a two-sided draw followed by a one-sided draw at the same fusion center. This is accomplished, for example, by stopping the left-side translation stage part way through the normal two-sided draw. If a two-sided draw is continued without including a partial one-sided draw, the result resembles the curve 22 of FIG. 13. The two-sided draw usually results in somewhat narrower bandwidth than the combination of two-sided followed by one-sided drawing. Curves 21 and 22 were produced using the same amount of offset.

By comparison, however, curve 23 is produced using no offset and a two-sided draw in the manner typical of longitudinally symmetric tapered couplers of prior art. It can be seen that without the benefit of the offset, the bandwidth is smaller than in couplers of the invention.

What is claimed is:

1. A wideband single-mode fiber optic coupler wherein at least two fibers are joined in a fused and tapered coupling region, wherein the taper is asymmetrical in the longitudinal extent about the mid point of the geometric center of the fused coupling region with the difference between the fiber diameters in that region changing at a varying rate along the length of the region.

2. The single-mode coupler of claim 1 formed by at least one pretapered fiber, the maximum coupling ratio of said coupler being determined by offset of the location of said coupler relative to the minimum diameter of said pretapered fiber.

3. A coupler as in any one of claim 1 and 2 wherein the coupling region is not symmetrical in transverse cross-section.

4. A coupler as in any one of claim 1 and 2 wherein the coupling region is symmetrical in transverse cross-section.

5. A method of making a coupler comprising pretapering a region of one fiber a predetermined amount by elongating a heated region of that fiber, bringing the pretapered region of said fiber into side-by-side contact with a region of a second fiber having a different local geometry, heating the combined fibers so that the center of heating is offset longitudinally from the center of the pretapered region of the first fiber, and elongating the heated region of the combined fibers by drawing to form a fused coupler.

6. The method of claim 5 in which the combined fibers are drawn simultaneously for at least a portion of the draw in both directions relative to the center of the heated region.

7. The method of making a coupler as, in claim 5 wherein the combined fibers are drawn simultaneously for at least a portion of the draw in only one direction relative to the center of the heated region.

8. A method of making a coupler as in claim 5, 6, or 7 wherein at least one of the fibers is etched prior to heating.

9. The method of making a coupler as in claim 5, 6, or 7 wherein the method of holding the fibers together for fusion comprises crossing the fibers relative to one another.

10. The method of making a coupler as in claim 5, 6, or 7 wherein the method of holding the fibers together comprises holding the fibers in a substantially common plane while urging the fibers together sideways.

11. The method of claim 5, 6 or 7 wherein prior to said pretapering of said first fiber said first and second fiber are identical in cross-section.

12. A method of making a coupler comprising pretapering a region of first and second optical fibers to be coupled, each of said fibers being pretapered a predetermined amount by elongating a heated region of said fiber; bringing said pretapered fibers into side-by-side contact, the points of said contact having different local geometries; and heating the combined fibers so that the center of heating is offset longitudinally relative to the center of the pretapered region of at least one of the fibers and elongating said heated region by drawing to form a fused coupler.

13. The method of claim 12 wherein said first and second fibers have differing degrees of pretaper.

14. The method of claim 12 wherein prior to said pretapering said fibers are of identical cross-section.

15. The method of claim 12, 13, or 14 in which the combined fibers are drawn simultaneously for at least a portion of the draw in both directions relative to the center of the heated region.

16. The method of making a coupler as in claim 12, 13 or 14 wherein the combined fibers are drawn simultaneously for at least a portion of the draw in only one direction relative to the center of the heated region.

17. The method of any one of claim 5 or 12 further comprising selecting the coupling ratio between said fibers by fusing fibers about a selected point along a pretapered fiber.

18. A method of making a coupler comprising forming a pretapered region of predetermined geometry on an optical fiber by heating a length of about 3 to 5 mm of said fiber and elongating said fiber about 2 mm about said heated length,
bringing said pretapered region of said fiber into side by side contact with a region of a second fiber having a different local geometry and heating the combined fibers so that the center of said heating is offset longitudinally from the center of the pretapered region and elongating the heated region of the combined fibers by drawing said fibers such that at least a portion of said draw is in both directions relative to the center of said heated region.

19. The method of claim 18 wherein at least a portion of said draw is in one direction relative to the center of said heated region.

* * * * *

UNITED STATES PATENT AND TRADEMARK OFFICE
CERTIFICATE OF CORRECTION

PATENT NO. : 4,997,248

DATED : March 5, 1991

INVENTOR(S) : David W. Stowe

It is certified that error appears in the above-identified patent and that said Letters Patent is hereby corrected as shown below:

Col. 1, line 50, delete "±" after "1300nm" should read --1300 nm +/-40-- (2nd occurrence)

Col. 4, line 67, "Fig 13" should be --Fig. 8 --.

Signed and Sealed this

First Day of December, 1992

Attest:

DOUGLAS B. COMER

*Attesting Officer*   Acting Commissioner of Patents and Trademarks